United States Patent
Kikuchi

(10) Patent No.: US 6,831,908 B2
(45) Date of Patent: Dec. 14, 2004

(54) DATA COMMUNICATION SYSTEM AND METHOD

(75) Inventor: Tsuneyuki Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 917 days.

(21) Appl. No.: 09/729,045

(22) Filed: Dec. 4, 2000

(65) Prior Publication Data

US 2001/0002910 A1 Jun. 7, 2001

(30) Foreign Application Priority Data

Dec. 3, 1999 (JP) .......................................... 11-344063

(51) Int. Cl.[7] .............................................. H04Q 7/24
(52) U.S. Cl. ...................... 370/338; 370/389; 370/349; 370/455; 370/556.2
(58) Field of Search ................................ 370/338, 345, 370/349, 389, 392, 412, 428, 429; 714/746, 748, 749, 750, 751; 445/422.1, 445, 556.1, 556.2, 551

(56) References Cited

U.S. PATENT DOCUMENTS

| | | | |
|---|---|---|---|
| 5,774,479 A | | 6/1998 | Lee et al. |
| 5,862,326 A | | 1/1999 | Bapat |
| 6,076,181 A | * | 6/2000 | Cheng .......................... 714/748 |
| 6,088,588 A | * | 7/2000 | Osborne ...................... 455/425 |
| 6,226,301 B1 | * | 5/2001 | Cheng et al. ................ 370/474 |
| 6,473,399 B1 | * | 10/2002 | Johansson et al. .......... 370/229 |
| 6,557,134 B2 | * | 4/2003 | Bims et al. .................. 714/748 |

FOREIGN PATENT DOCUMENTS

| | | |
|---|---|---|
| JP | 63-299631 | 12/1988 |
| JP | 11-266276 | 9/1999 |
| WO | WO 98/43463 | 10/1998 |

OTHER PUBLICATIONS

Japanese Office Action issued Oct. 22, 2002 (w/ English translation).

Bakshi et al., Proceedings of the 17th International Conference on Baltimore, Maryland, U.S.A. (May 27–30, 1997, pp. 365–373).

European Search Report No. 00310698.6 dated Oct. 28, 2002.

* cited by examiner

*Primary Examiner*—Bob A. Phunkulh
(74) *Attorney, Agent, or Firm*—Dickstein, Shapiro, Morin & Oshinsky, LLP.

(57) ABSTRACT

A data communication system, which sends or receives data to or from an application server using the same protocol via a transmission line as one of a wire communication network, a wireless communication network, and both a wire communication network and a wireless communication network, comprises a table 14 containing therein a relation among a service identifier of the application server, a destination address, a communication network type, and a processing time of the application server; and a retransmission timer setting unit 16 which references the table to obtain the processing time of the application server based on the service identifier, destination address, and communication network type during transmission or reception of data to or from the application server and sets the time as a retransmission time.

13 Claims, 9 Drawing Sheets

| SERVICE IDENTIFIER | DESTINATION ADDRESS | COMMUNICATION NETWORK TYPE | RTT(S) |
|---|---|---|---|
| WWW | aaa.bbb.ccc.ddd | WIRE COMMUNICATION NETWORK 1 | 2 |
| WWW | www.xxx.yyy.zzz | WIRELESS COMMUNICATION NETWORK 1 | 15 |
| ELECTRONIC MAIL | xxx.xxx.xxx.xxx | WIRELESS COMMUNICATION NETWORK 2 | 8 |
| FILE TRANSFER | aaa.bbb.ccc.ddd | WIRE COMMUNICATION NETWORK 1 | 0.1 |

FIG. 5

WIRELESS COMMUNICATION NETWORK 2

| RADIO WAVE STRENGTH | ERROR RATE | COMMUNICATION NETWORK TYPE | COMMUNICATION NETWORK SPEED (BITS/SEC) | SENDING BUFFER SIZE (BYTES) |
|---|---|---|---|---|
| 4 | $10^{-4}$ | WIRELESS COMMUNICATION NETWORK 1 | 29.2 | 8192 |
| 4 | $10^{-4}$ | WIRELESS COMMUNICATION NETWORK 2 | 9.6 | 1024 |
| ... | ... | ... | ... | ... |
| 1 | $10^{-1}$ | WIRELESS COMMUNICATION NETWORK 1 | 5.0 | 576 |

DATA COMMUNICATION SYSTEM AND METHOD

FIELD OF THE INVENTION

The present invention relates to a data communication system that sends and receives data to or from an application server via a transmission line comprising one type of a wire communication network, a wireless communication network, and both a wire communication network and a wireless communication network. More particularly, the present invention relates to a data communication system and a data communication method not affected by transmission line characteristics.

BACKGROUND OF THE INVENTION

Recently, as the Internet technology has become widely used, the user accesses the Internet from a data communication terminal in a variety of ways.

Conventionally, the user accesses the Internet, in most cases, via a wire communication network such as a LAN (Local Area Network) in which terminals are connected by Ethernet or via a wire communication network in which telephone lines and modems are used. Today, in addition to access via those networks, more and more users access the Internet via both a wireless communication network, such as PHS (Personal Handy Phone System) and PDC (Personal Digital Cellular), and a wire communication network.

The only requirement for accessing the Internet is that the IP (Internet Protocol) must be used for the communication protocol hierarchy (layer) that provides data communication terminals with the terminal-to-terminal data transfer function. It is requested to transmit data as effectively as possible on a transmission protocol hierarchy layer in the communication protocol hierarchy. For increased efficiency, many transmission protocols are proposed.

A transmission protocol for accessing the Internet in a wire communication network is optimized for the characteristics of the configuration of a wire network in which a plurality of LANs are connected via routers. The protocol is designed for providing best performance in such a wire network.

On the other hand, a transmission protocol for accessing the Internet in a wireless communication network is optimized for the characteristics of a wireless network that has a large data transmission delay and a narrow transmission bandwidth, so that the protocol is designed for providing best performance in such a network.

SUMMARY OF THE DISCLOSURE

Under the conditions described above, a data communication terminal efficiently accesses the Internet using the same protocol via one of a wire communication network, a wireless communication network, and both a wire communication network and a wireless communication network in one of the following methods:

(1) Install both transmission protocols on a data communication terminal, which are switched depending upon the transmission line to be used.

(2) Install the transmission protocol optimized for one type of communication networks, wire or wireless. The effect of the characteristics of the other communication network is suppressed.

First, the former (1) has a problem that increases the amount of memory resources of the data communication terminal, increases the terminal size, and therefore makes the terminal impractical. The latter (2) has a second problem that significantly decreases the throughput of the other, non-optimized communication network and therefore requires positive unit for suppressing the effect of the characteristics of the other communication network.

SUMMARY OF THE DISCLOSURE

According to the investigations toward the present invention, the following analyses are given to the conventional art.

In solving the above problems, there are two factors that are affected by the characteristics of a wire communication network and a wireless communication network. One is the server processing time (RTT: Round Trip Time) that determines the time that is set in the retransmission timer. The other is the amount of free space in the receiving buffer at the destination that determines the sending buffer size.

FIG. 8 is a diagram showing the amount of the free space in the receiving buffer at the destination. As shown in the figure, when a data communication terminal sends or receives data to or from an application server (AP server) using the same protocol via a transmission line over one of a wire communication network, a wireless communication network, and both a wire communication network and a wireless communication network, the amount of free space in the receiving buffer at the destination affects the transmission speed of the communication network and the processing speed of the destination terminal.

That is, in case where the sending data communication terminal determines the sending buffer size based on the amount of free space of the receiving buffer of the destination AP server, the above-described first problem of allocating unnecessary memory resources arises if the communication network speed is lower than the processing speed of the destination terminal.

FIG. 9 is a diagram showing the relation between the application server processing time and the retransmission time. As shown in this figure, when the data communication terminal sends or receives data to or from the application server using the same protocol via a transmission line in one of a wire communication network, a wireless communication network, and both a wire communication network and a wireless communication network, the AP server processing time (RTT) is closely associated with a transmission delay (or none) caused by data errors on the communication network and with the retransmission time (timer). Therefore, an improper retransmission timer value, if set, would result in an incorrect data-loss detection and an unnecessary retransmission of a packet or in an unnecessary suppression of packet retransmission, thus generating the second problem which decreases throughput significantly. In other words, when a value that is set in the retransmission timer is too small, a data loss is detected mistakenly and an unnecessary packet or packets is retransmitted. Conversely, when a value that is set in the retransmission timer is too large, a data loss cannot be detected even if generated and so the retransmission of a packet or packets is delayed.

Thus there is much to be desired in the art.

In view of the foregoing, it is an object of the present invention to provide a data communication system and a data communication method not affected by the transmission line characteristics when data is transferred between a data communication terminal and an AP server using the same protocol via a transmission line comprising one of a wire communication network, a wireless communication network, and both a wire communication network and a wireless communication network.

To solve the above problems, a data communication system which sends or receives data to or from an application server using the same protocol via a transmission line comprising one type of a wire communication network, a wireless communication network, and both a wire communication network and a wireless communication network is provided. The data communication system comprises a first table containing therein a relation among a service identifier of the application server, a destination address, a communication network type, and a processing time of the application server; and a retransmission timer setting unit which references the first table to find the processing time of the application server based on the service identifier, destination address, and communication network type during transmission or reception of data to or from the application server and sets the time as a retransmission time.

This formulation sets the retransmission timer properly and therefore reduces the possibility of unnecessary retransmission of packets due to an incorrect data-loss detection or the possibility of unnecessary suppression of transmission at retransmission time, significantly increasing throughput.

Preferably, the data communication system further comprises a radio status acquisition unit which acquires a radio wave strength of the wireless communication network and an error rate of data sent to or received from the wireless communication network from a wireless base station connected via a physical line; and a second table containing therein a relation among radio wave strength of the wireless communication network, error rate of data sent to or received from the communication network, the communication network type, and communication network transmission speeds, wherein the retransmission timer setting unit references the second table, calculates the transmission/reception time for each packet size based on the radio wave strength and the error rate acquired from the radio status acquisition unit, and sets a sum of the processing time of the application server and the calculated transmission/reception time of the packet as a retransmission timer value.

This formulation allows a retransmission timer value to be set according to the transmission line characteristics.

In addition, the present invention provides a data communication system which sends or receives data to or from an application server using the same protocol via a transmission line comprising one type of a wire communication network, a wireless communication network, and both a wire communication network and a wireless communication network. The data communication system comprises (a) a variable-length sending buffer in which data to be sent to the application server is stored; (b) a table containing therein a relation among radio wave strength of the wireless communication network, error rates of data sent to or received from the communication network, communication network types, communication network transmission speeds, and sizes of the sending buffer; (c) and a buffer size controller which references the table to adjust the size of the sending buffer based on the acquired radio wave strength and the error rate.

This formulation eliminates the need for allocating unnecessary memory resources when the transmission speed of the communication network is lower than the processing speed of the destination terminal.

Preferably, the data communication system further comprises a radio status acquisition unit which acquires the radio wave strength of the wireless communication network and the error rate of data sent to or received from the wireless communication network from a wireless base station connected via a physical line and outputs the acquired information to the buffer size controller.

This formulation allows the sending buffer size to be adjusted according to the transmission line characteristics. That is, when the radio wave strength is low or the data error rate is high, the transmission band of the communication network becomes narrow and so the sending buffer may be reduced in size (or volume).

Preferably, a linking (or relaying) server, which sends or receives data to or from the application server over the wire communication network, divides a connection with the application server into two sub-connections and applies a transmission protocol to each sub-connection.

This formulation reduces the amount of packets that are sent to or received from the wireless communication network.

Preferably, the data communication system further comprises a network interface controller which controls a transmission of a packet to the wire communication network or the wireless communication network and sends information on the type of the communication network, to which the packet has been transmitted, to the retransmission timer setting unit or the buffer size controller.

This formulation allows the retransmission timer setting unit to set a retransmission timer value, and the buffer size controller to adjust the size (or volume) of the sending buffer.

Preferably, the data communication system further comprises a transfer controller which controls establishment of a connection with the application server for use in packet transmission and passes the service identifier and the destination address to the retransmission timer setting unit.

This formulation allows the retransmission timer setting unit to set a retransmission timer value.

Preferably, the communication network type (or species) contained in the table comprises only the wireless communication network type.

Because the wireless communication network is easily affected by the transmission line characteristics, eliminating this effect makes the table configuration simpler.

In addition, the present invention provides a data communication system which sends or receives data to or from an application server using the same protocol via a transmission line as one type (species) of a wire communication network, a wireless communication network, and both a wire communication network and a wireless communication network. The data communication system comprises: (a) a first table containing therein relation among service identifiers of the application server (s), destination addresses, communication network types, and processing time of the application server;

(b) a retransmission timer setting unit which references the first table to acquire the processing time of the application server based on the service identifier, destination address, and communication network type during transmission or reception of data to or from the application server and sets the time as a retransmission time;

(c) a variable-length sending buffer in which data to be sent to the application server is stored;

(d) a second table containing therein the relation among radio wave strength of the wireless communication network, error rates of data sent to or received from the communication network, the communication network types, and communication network transmission speeds; and (e) a buffer size controller which references the second table to adjust size of the sending buffer based on the acquired radio wave strength and the error rate.

This formulation sets the transmission timer properly and therefore reduces the possibility of unnecessary retransmission of packets due to an incorrect data-loss detection or the possibility of unnecessary suppression of transmission at retransmission time, significantly increasing the throughput. At the same time, when the transmission speed of the communication network is lower than the processing speed of the destination terminal, there is no need for allocating unnecessary memory resources.

This enables a data system not affected by transmission line characteristics to be built.

In addition, according to a further aspect of the present invention, there is provided a data communication method for sending or receiving data to or from an application server using the same protocol via a transmission line comprising one type of a wire communication network, a wireless communication network, and both a wire communication network and a wireless communication network. The data communication method comprises the steps of: (a) storing relation among service identifiers of the application server, destination addresses, communication network types, and processing time of the application server in a table; and (b) referencing the table to set the processing time of the application server as a retransmission time based on the service identifier, destination address, and communication network type during transmission or reception of data to or from the application server.

This method sets the transmission timer properly and therefore reduces the possibility of unnecessary retransmission of packets due to an incorrect data-loss detection or the possibility of unnecessary suppression of transmission at retransmission time, significantly increasing throughput.

BRIEF DESCRIPTION OF THE DRAWINGS

FIG. 5 is a diagram showing an example of the table 17 in FIG. 2.

PREFERRED EMBODIMENTS OF THE INVENTION

An embodiment of the present invention will now be described more in detail with reference to the drawings.

Figure 1:
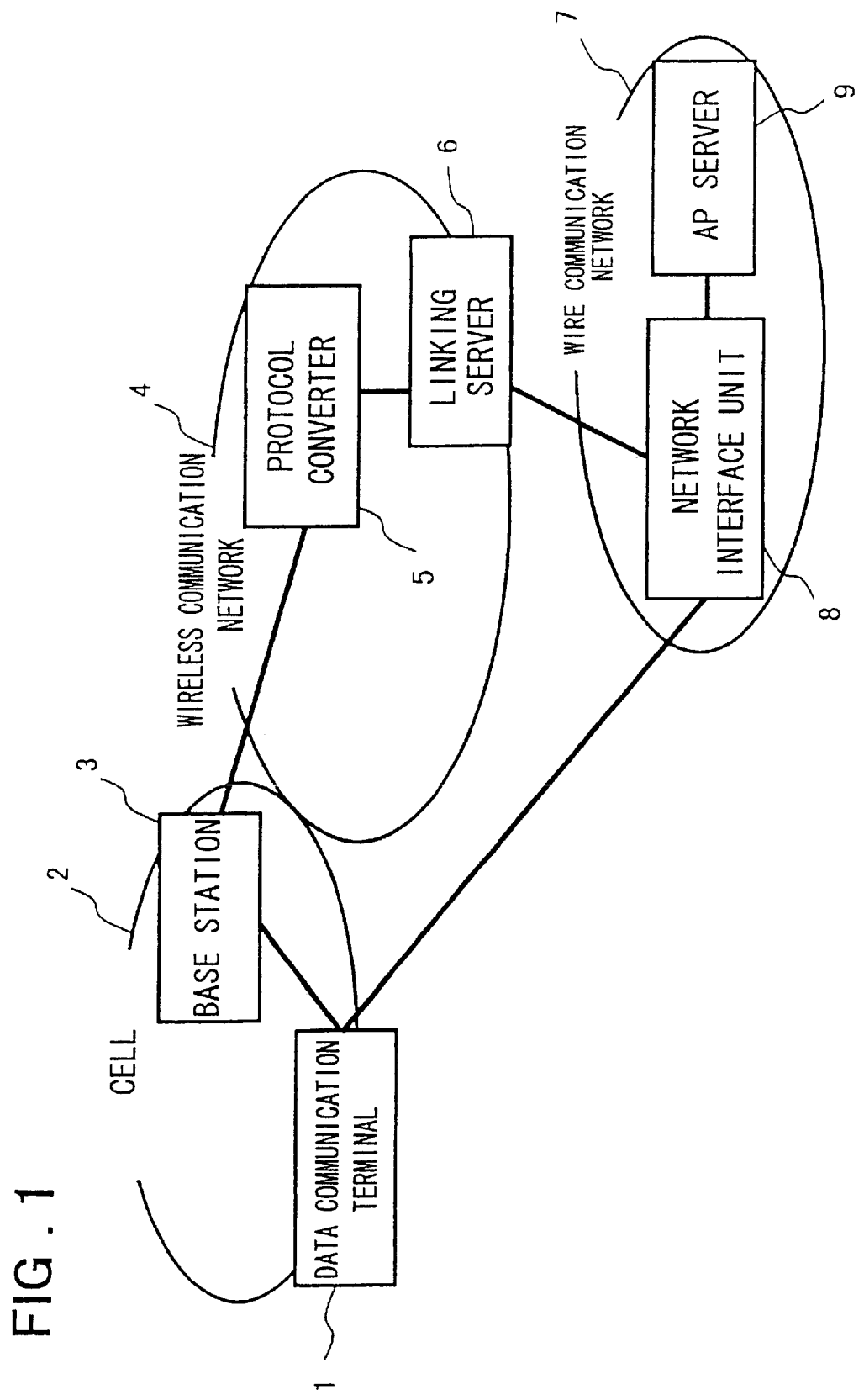
FIG. 1 is a block diagram showing the basic configuration of a data communication system according to the present invention that is not affected by transmission line characteristics.

FIG. 1 is a block diagram of a data communication system according to the present invention that is not affected by transmission line characteristics.

As shown in this figure, a data communication terminal 1 is provided in the data communication system. The data communication terminal 1 sends data to or from an application server (AP server) using the same transmission protocol via one type (or species) of a wire communication network 7, a wireless communication network 4, and both the wireless communication network 4 and the wire communication network 7.

In this specification, data refers to user data.

An AP server 9 is a terminal that establishes a connection with the data communication terminal 1 and sends back a response (including data and information) in response to a request from the data communication terminal 1.

The wireless communication network 4, which uses a PHS, PDC, and so on, is a communication network that connects a base station 3 to a linking (or relaying) server 6 or to the AP server 9 via a protocol converter 5.

The base station 3, located in a cell (i.e., a unit area of wireless communication) 2, connects a physical line to the data communication terminal 1.

The protocol converter 5 converts data communicated between the wireless communication network 4 and the wire communication network 7 in accordance with the communication network.

The wire communication network 7, which uses LANs (Local Area Network) or the Internet, is a communication network that connects to the AP server 9 via a network interface unit 8 such as a router.

The linking server 6 is a terminal that subdivides the connection between the data communication terminal 1 and the AP server 9 into two sub-connections: a first sub-connection between the data communication terminal 1 and the linking server 6 and a second sub-connection between the linking server 6 and the AP server 9. The linking server 6 applies a transmission protocol to each sub-connection to reduce the amount of packets sent to or received by the wireless communication network 4. It may also act as or substitute for the AP server 9.

A packet refers to a data block composed of user data and a header or composed of control data and a header.

Figure 2:
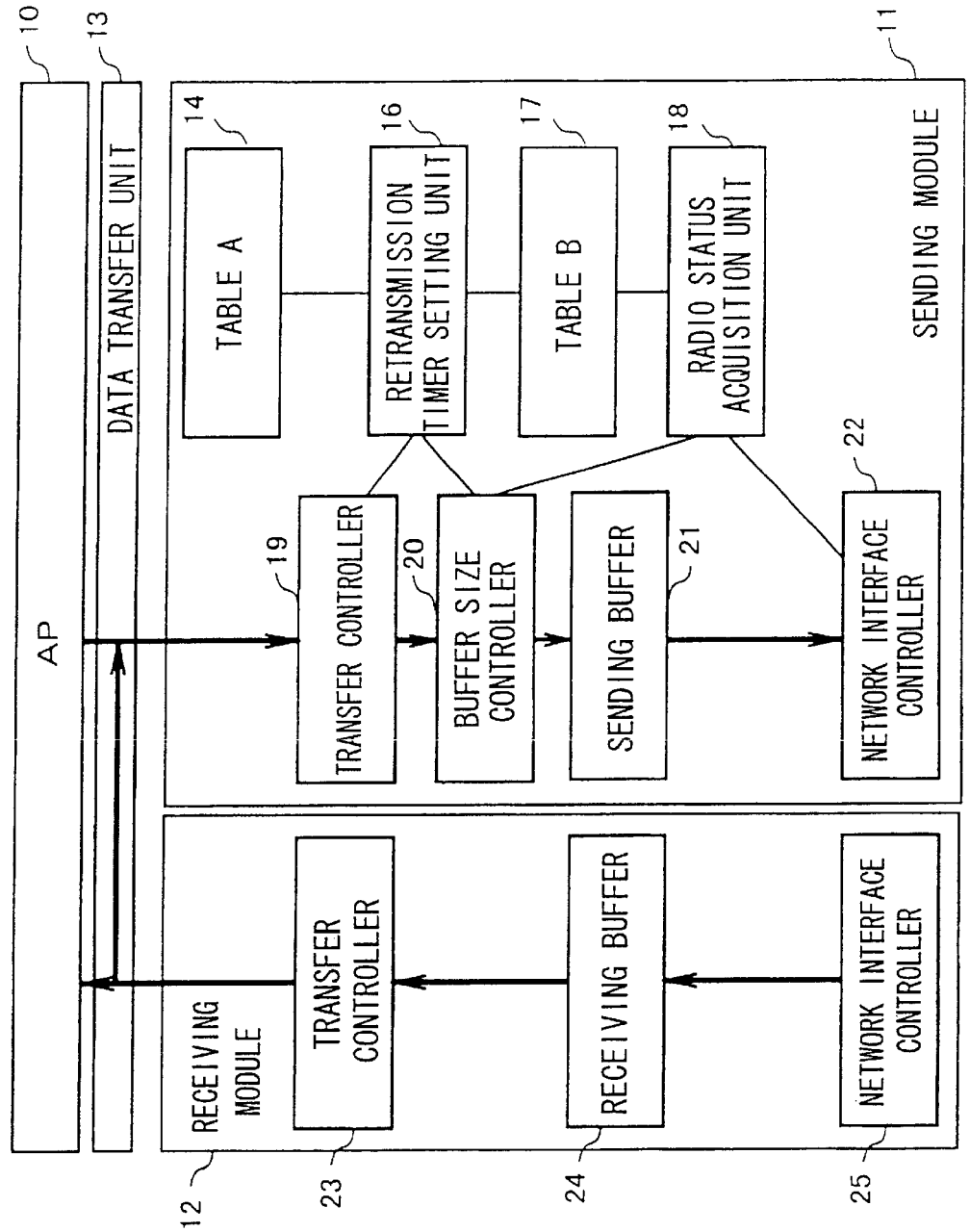
FIG. 2 is a block diagram showing the general configuration of the data communication terminal 1 in FIG. 1.

FIG. 2 is a block diagram showing a general configuration of the data communication terminal 1 shown in FIG. 1. As shown in the figure, the data communication terminal 1 comprises a sending module 11 and a receiving module 12 which establish a connection with the AP server 9 for sending and receiving packets to or from it, an AP 10, and data transfer unit 13 that is a data transfer path between the sending module 11/receiving module 12 and the AP 10.

The sending module 11 comprises a table (table A) 14 which contains information on the relation between a pair of a service identifier/destination address and a server processing time required for a service indicated by the service identifier; a retransmission timer setting unit 16 which sets a retransmission timer value (a period of time between the moment a packet is sent and the moment the packet is determined as lost or failed and is retransmitted; a table (table B) 17 which contains information on the correlation between the radio communication network status (radio wave strength between the data communication terminal and the base station, or error rate of data sent or received to or from the wireless communication network) and the sending buffer size; and a radio status acquisition unit 18 which acquires the status of the wireless communication network 4 from the base station 3. There are a transfer controller 19 which establishes a connection with the transfer controller of the AP server 9 for transmission of packets; a buffer size controller 20 which adjusts the size of a sending buffer 21 based on the status of the wireless communication network 4 and information in the table 17; a variable-length sending buffer 21 in which data to be sent to the AP server 9 is stored; and a network interface controller 22 which sends packets to the wire communication network 7 or the wireless communication network 4.

The receiving module 12 comprises a transfer controller 23 which receives packets from the transfer controller of the AP server 9; a receiving buffer 24; and a network interface controller 25 which receives packets from the wire communication network 7 or the wireless communication network 4.

In the above description, the sending module 11 and the receiving module 12 are separated to simplify the description. These two modules may be integrated into one.

Figure 3:
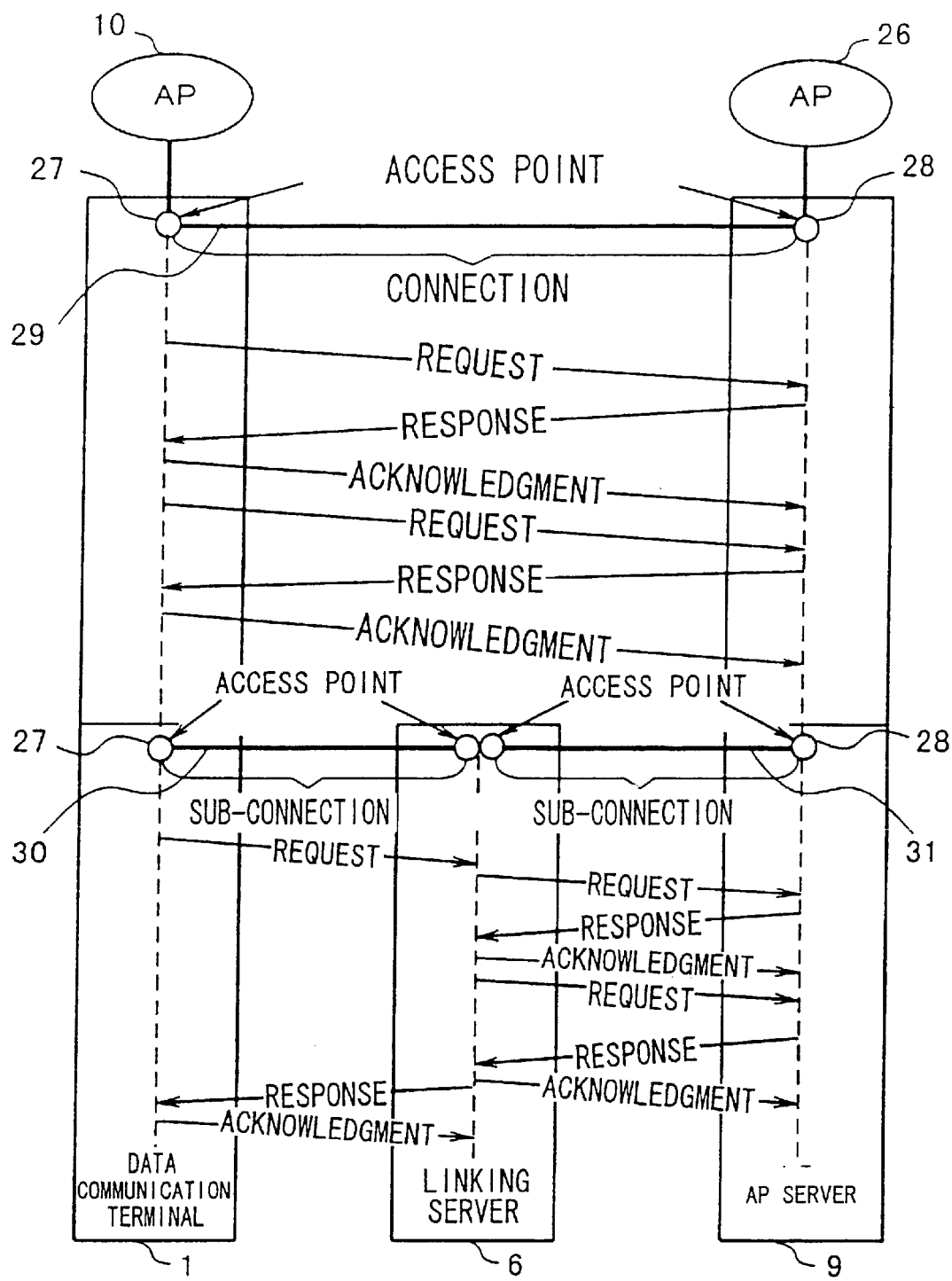
FIG. 3 is a diagram showing the concept of a connection between the data communication terminal 1 and a linking server 6 and between the linking server 6 and an AP server 9.

FIG. 3 is a diagram showing the concept of a connection between the data communication terminal 1, linking server 6, and AP server 9.

According to a transmission protocol for implementing reliable, connection-oriented data reception and transmission such as TCP (Transmission Control Protocol), access points 27 and 28, each identified by a pair of a service identifier and a sending address, are provided to the AP 10 and AP 26, respectively. A connection 29 is established for each two (pair) applications (server and/or terminal) which communicate each other.

The AP 10 and the AP 26 send and receive three types of phase data—a request, a response, and an acknowledgment—via the connection 29.

The linking server 6, which acts as an end point of the wireless communication network 4 and the wire communication network 7, divides the connection 29 into two sub-connections: one is a sub-connection 30 between the data communication terminal 1 and the linking server 6, and the other is a sub-connect ion 31 between the linking server 6 and the AP server 9. This division allows a larger amount of processing for a request to be executed in the wire communication network 7 (between the linking server 6 and the AP server 9), thus reducing the number of packets that are sent to or received by the wireless communication network 4.

Figures 4A, 4B:
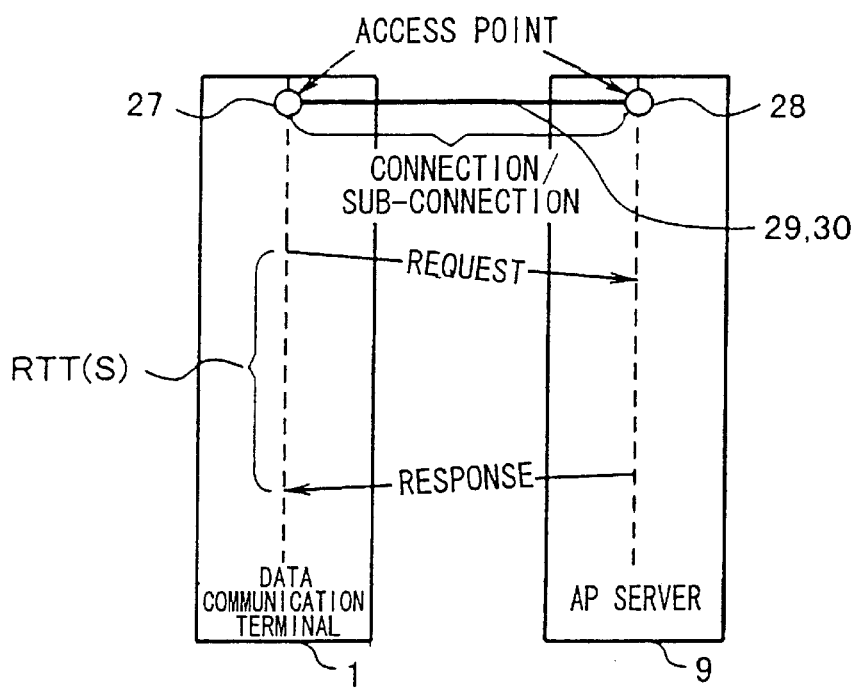
FIG. 4 is a diagram showing an example of the table 14 in FIG. 2.

FIG. 4 is a diagram showing an example of the table 14 shown in FIG. 2. As shown in FIG. 4(*a*), the table 14 is composed of items including service identifier, destination address, communication network type, and server processing time (RTT(s)).

The service identifier is a value identifying a service to be executed between the data communication terminal 1 and the AP server 9.

The destination address is a value identifying the physical address (destination) of the AP server 9.

The communication network type (species) is a value identifying the communication network to which the data communication terminal 1 is to be connected.

As shown in FIG. 4(*b*), the AP server processing time (RTT(s)) is a period of time between a moment the data communication terminal 1 starts to send a packet and a moment a response to the packet is received on the connection 29 or the sub-connection 30. This connection or a sub-connection is the one established by the data communication terminal 1 and the AP server 9 between the access points 27 and 28, each identified by a pair of the service identifier and the destination address. The server processing time is to be defined preliminarily for each service.

FIG. 5 is a diagram showing an example of the table 17 shown in FIG. 5. As shown in the figure, the table 17 is composed of items including radio wave strength value between the wireless data communication terminal 1 and wireless the base station 3, error rate of data sent to or received from the wireless communication network 4, communication network type, communication network transmission speed, and sending buffer size.

When the radio wave strength is low or when the data error rate is high, the buffer size is reduced because the transmission band of the communication network should be narrow (a smaller amount of data can be transferred per second).

Figure 6:
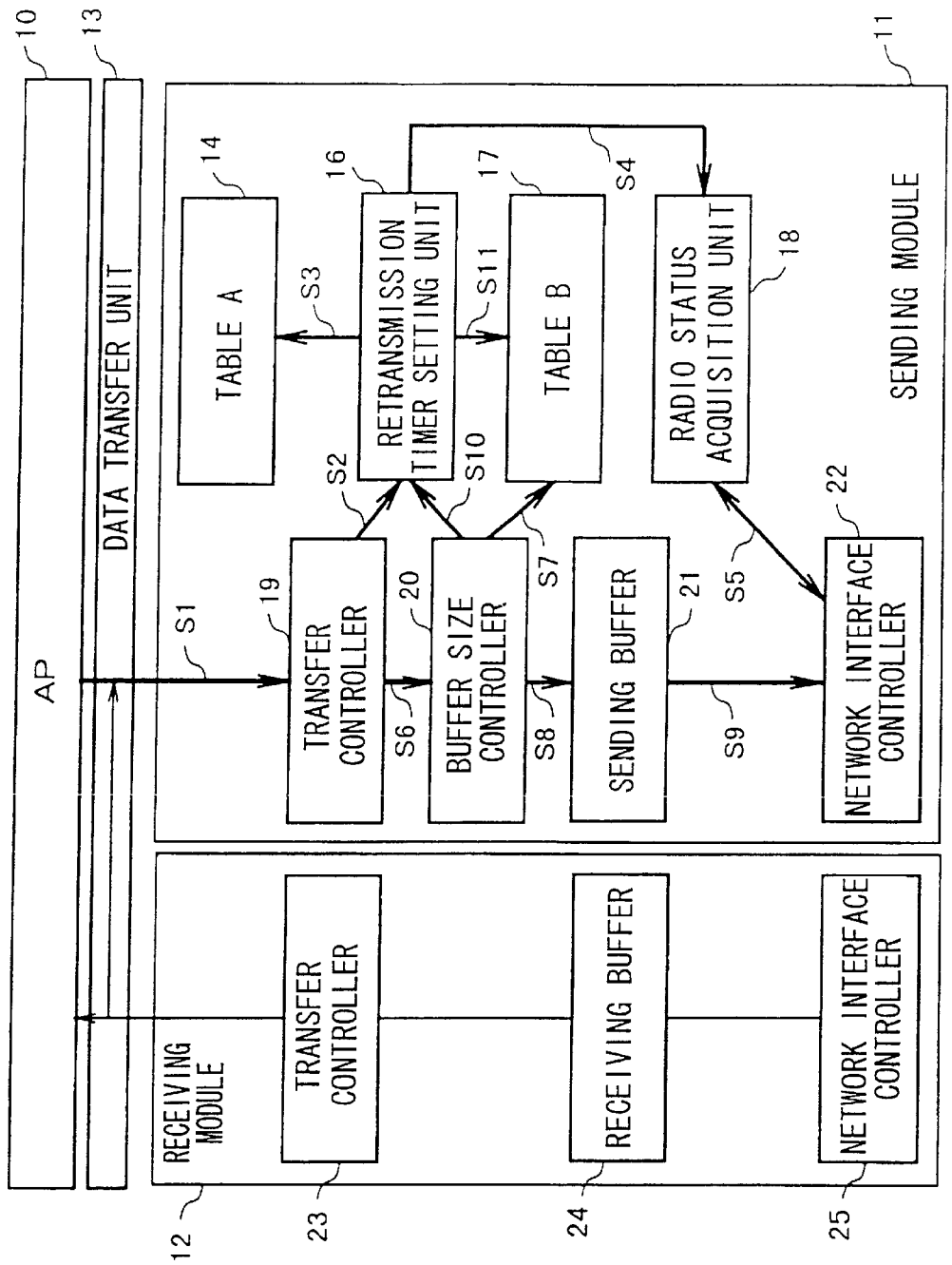
FIG. 6 is a diagram showing an example of operation in which a retransmission timer is set in the data communication system.

FIG. 6 is a diagram showing an example of operation that is executed to set the retransmission timer in the data communication system.

As shown in the figure, when the user starts an operation to send or receive data in step S1, the AP 10 connects a physical line to the AP server 9 via a network interface controller 22 and via the wire communication network 7 or the wireless communication network 4. The access point 27 is opened by a pair of the service identifier and the destination address to start sending data to the transfer controller 19.

In step S2, when the access point 27 is opened, the transfer controller 19 passes the pair of the service identifier and the destination address to the retransmission timer setting unit 16.

In step S3, when the pair of the service identifier and the destination address is passed, the retransmission timer setting unit 16 references the table 14 (TABLE A) and sets the corresponding AP server processing time (RTT) as a retransmission time.

In step S4, the communication network type is stored in the buffer. When the communication network type is the wireless communication network 4, a radio status acquisition request is sent to the radio status acquisition unit 18.

In step S5, the radio status acquisition unit 18 acquires from the base station 3 a radio wave strength value between the data communication terminal 1 and the base station 3 and an error rate (status of wireless communication network 4) of data sent to or received from the wireless communication network 4. These values are acquired at a given time interval or when the values change. The acquired values are stored in the buffer.

The status of the wireless communication network 4 is acquired from the base station 3, in most cases, via an AT command interface. This description is omitted here because it is outside the range of the present invention.

In step S6, the transfer controller 19 generates a connection connect request packet to connect to the AP server 9 if a connection is not yet established with the AP server 9.

At a timing that When data passed from the AP 10 is transformed into a packet, the packet identification number and the retransmission timer value are stored in the buffer and a notification is sent to the buffer size controller 20.

When no response or acknowledgment to the packet corresponding to the packet identification number is received from the AP server 9 within the time indicated by the retransmission timer value, the same packet is sent again.

In step S7, when a packet other than a connection connect request packet is passed from the transfer controller 19 and when data is to be sent via the wireless communication network 4, the buffer size controller 20 references the table 17 (TABLE B) to get the sending buffer size corresponding to the pair of the status of the wireless communication network 4 and the communication network type.

In step S8, when the sum of the size of the sending buffer 21 at that time and the size of the packet to be sent is smaller than the storage size of the sending buffer 21, the packet is concatenated to the sending buffer 21.

In step S9, when the packet is concatenated to the sending buffer 21, the network interface controller 22 reads the packet and sends data to the AP server 9 over the communication network.

In step S10, information on the identification number and the size of the concatenated packet is sent (notified) to the retransmission timer setting unit 16.

In step S11, the retransmission timer setting unit 16 calculates the radio transmission time from the following expression:

Radio transmission time=Notified packet-size/Communication network transmission speed.

The timer is set to activate the retransmission timer setting unit 16 after the time calculated by adding the AP server processing time (RTT) to the radio transmission time.

When the retransmission timer setting unit 16 is activated by the timer, it calculates the radio reception time from the following expression:

Radio reception time=Maximum notified-packet size/Communication network transmission speed.

The retransmission timer value corresponding to the packet identification number, which is stored in the buffer, is updated by the radio reception time.

The communication network transmission speed is the speed obtained from the table 17 (TABLE B) corresponding to the pair of the status of the wireless communication network 4 and the communication network type.

That is, the retransmission timer setting unit 16 calculates the transmission/reception time for each packet size based on the radio communication network status and the sending/receiving packet size and sets the sum of the AP server processing time and the transmission/reception time of each packet as the retransmission timer value.

This method allows the retransmission timer value to be set according to the transmission line characteristics.

Figure 7:
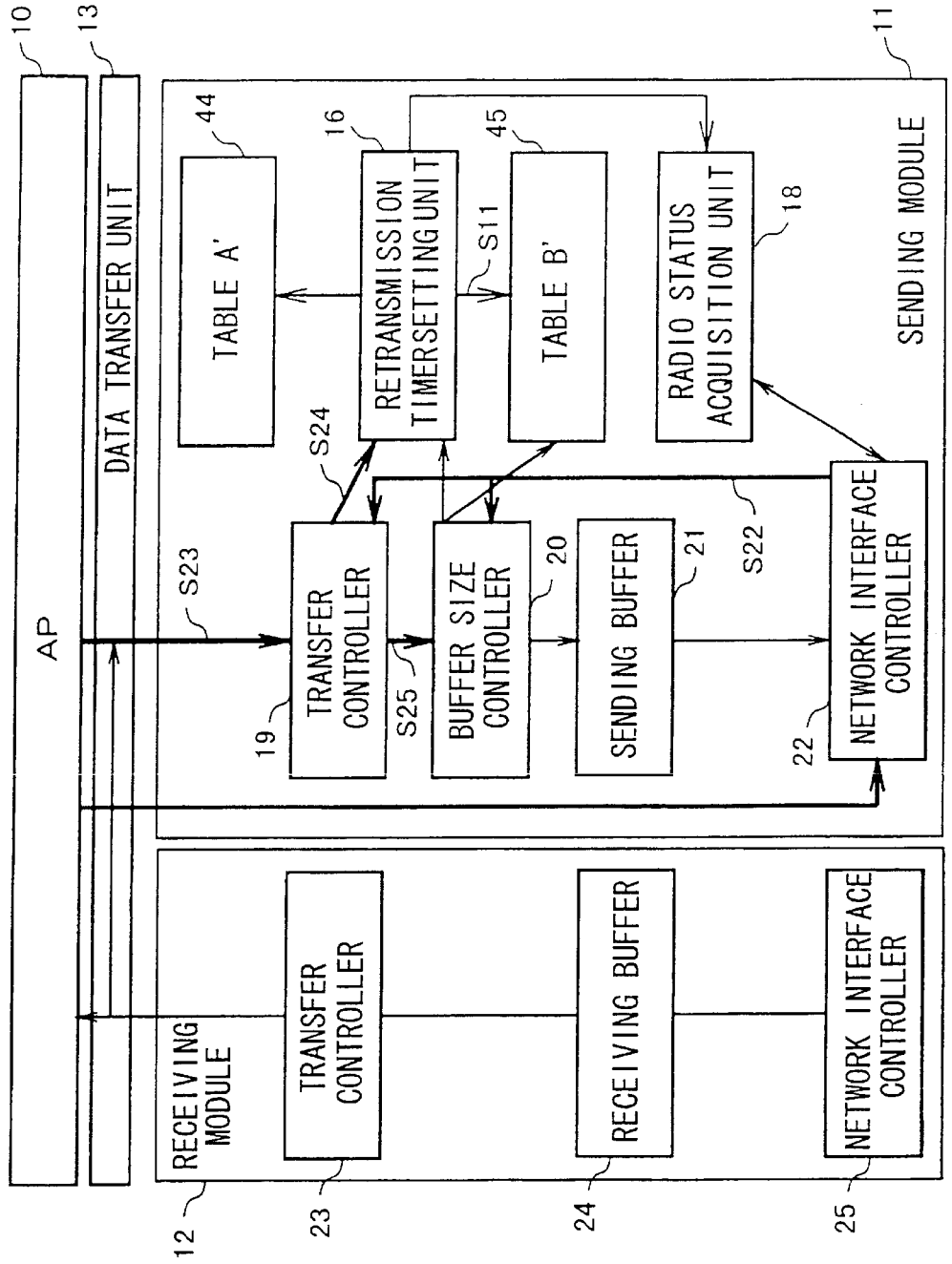
FIG. 7 is a diagram showing an example of operation in which information on the type of the communication network, to which the network interface controller 22 in FIG. 2 is connected, is sent to the transfer controller 19 and the buffer size controller 20 to set the retransmission timer.
Figure 8:
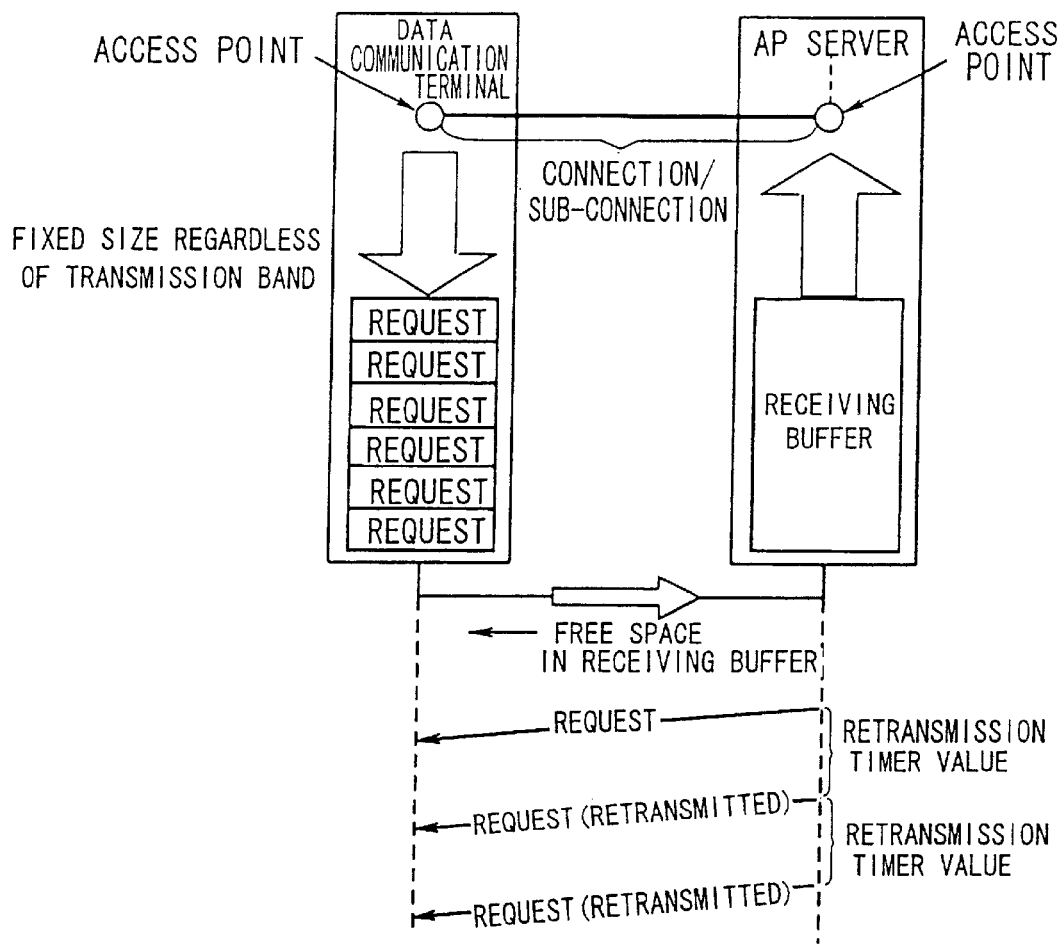
FIG. 8 is a diagram showing the free space of a receiving buffer at a destination.
Figure 9:
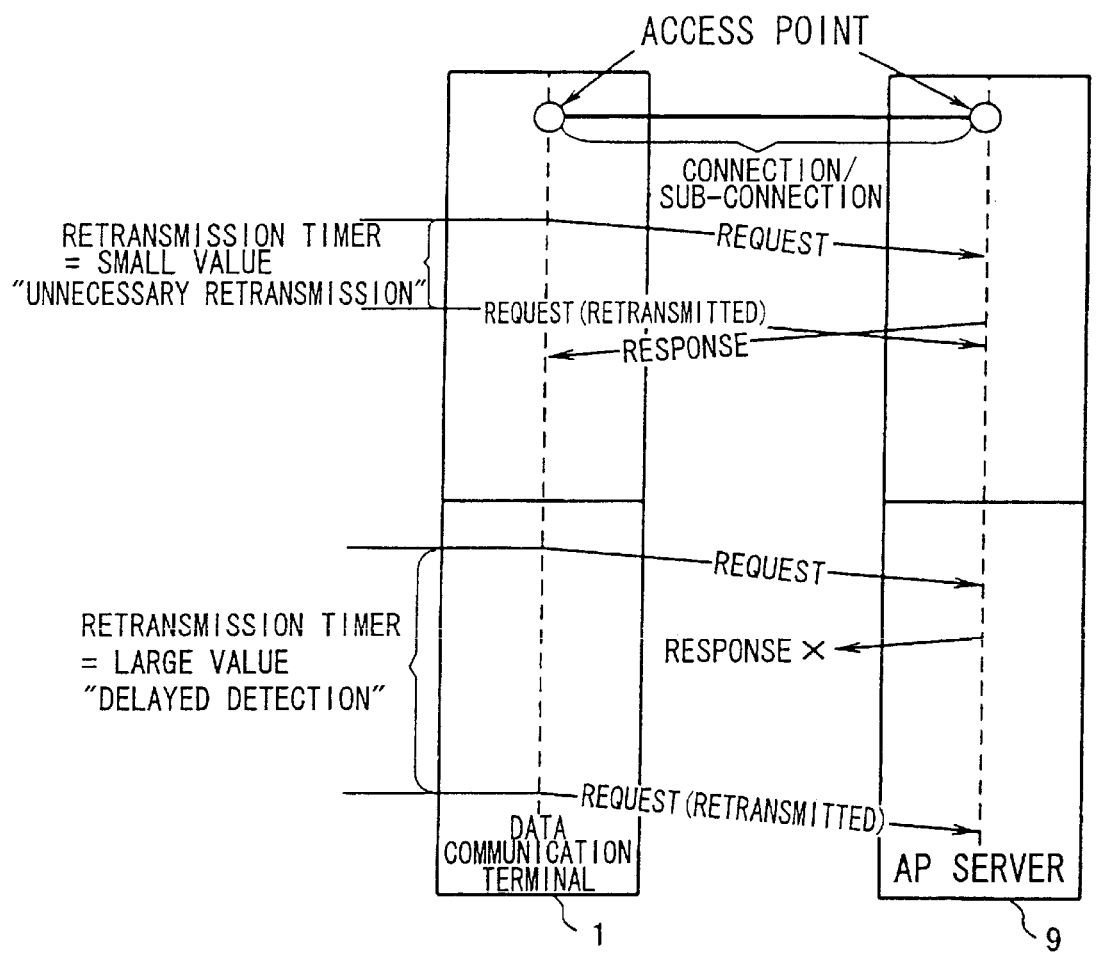
FIG. 9 is a diagram showing the relation between an application server processing time and a retransmission time.

FIG. 7 is a diagram showing an example of operation in which the information on the type of the communication network, to which the network interface controller 22 in FIG. 2 is connected, is sent to the transfer controller 19 and the buffer size controller 20 to set the retransmission timer.

As shown in the figure, when the user starts an operation to send or receive data in step S23, the AP 10 connects a physical line to the AP server 9 via the network interface controller 22 and via the wire communication network 7 or the wireless communication network 4.

In step S22, when the physical line is connected, the network interface controller 22 passes information on the communication type to the transfer controller 19 and the buffer size controller 20.

In step S23, the access point 27 is opened by a pair of the service identifier and the destination address to start sending data to the transfer controller 19.

In step S24, when the access point 27 is opened and when data is to be sent via the wireless communication network 4, the transfer controller 19 passes the pair of the service identifier and the destination address to the retransmission timer setting unit 16.

In step S25, when a connection is not yet established with the AP server 9, a connection connect request packet is generated to request a connection with the AP server.

In addition, when data passed from the AP 10 is transformed into a packet, the packet identification number and the retransmission timer value are stored in the buffer and a notification is sent to the buffer size controller 20.

When no response or acknowledgment to the packet corresponding to the packet identification number is received from the AP server 9 within the time indicated by the retransmission timer value, the same packet is sent again.

When data is sent via the wire communication network 7, the time between a moment the buffer size controller 20 stores the packet in the sending buffer 21 and a moment the AP server 9 returns a response is measured. The retransmission timer value is usually set based on the measured time. The description of how to set the retransmission timer value is omitted here.

The entry item "communication network type" in the table 14 in FIG. 4 and in the table 17 in FIG. 5 is replaced by the type of the wireless communication network 4 to generate a table (TABLE A') 44 and a table (TABLE B') 45. The table 44 and the table 45 are referenced only when data is sent via the wireless communication network 4.

Because the wireless communication network is easily affected by the transmission line characteristics, eliminating this effect makes the table configuration simpler.

The meritorious effects of the present invention are summarized as follows.

As described above, the system and the method according to the present invention sets the transmission timer properly and therefore reduces the possibility of unnecessary retransmission of packets due to an incorrect data-loss detection or the possibility of unnecessary suppression of transmission at retransmission time, significantly increasing throughput.

In addition, when the transmission speed of a communication network is lower than the processing speed of the destination terminal, there is no need for unnecessary memory resources to be reserved.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A data communication system which sends or receives data to or from an application server using the same protocol via a transmission line comprising one type selected from a group consisting of a wire communication network, a wireless communication network, and both a wire communication network and a wireless communication network, said data communication system comprising:

a first table containing therein a relation among a service identifier of the application server, a destination address, a communication network type, and processing time of the application server; and a retransmission timer setting unit which references said first table to acquire the processing time of the application server based on the service identifier, destination address, and communication network type during transmission or reception of data to or from said application server and sets the time as a retransmission time.

2. The data communication system as defined by claim 1, further comprising:
  a radio status acquisition unit which acquires a radio wave strength of the wireless communication network and an error rate of data sent to or received from the wireless communication network from a wireless base station connected via a physical line; and
  a second table containing therein a relation among radio wave strength of the wireless communication network, error rate of data sent to or received from the communication network, the communication network type, and communication network transmission speeds,
  wherein said retransmission timer setting unit references said second table, calculates the transmission/reception time for each packet size based on the radio wave strength and the error rate acquired from said radio status acquisition unit, and sets a sum of the processing time of the application server and the calculated transmission/reception time of the packet as a retransmission timer value.

3. A data communication system which sends or receives data to or from an application server using the same protocol via a transmission line comprising one type selected from the group consisting of a wire communication network, a wireless communication network, and both a wire communication network and a wireless communication network, said data communication system comprising:
  (a) a variable-length sending buffer in which data to be sent to the application server is stored;
  (b) a table containing therein relation among radio wave strength of the wireless communication network, error rates of data sent to or received from the communication network, communication network types, communication network transmission speeds, and sizes of said sending buffer; and
  (c) a buffer size controller which references said table to adjust the size of said sending buffer based on the acquired radio wave strength and the error rate.

4. The data communication system as defined by claim 3, further comprising:
  a radio status acquisition unit which acquires the radio wave strength of the wireless communication network and the error rate of data sent to or received from the wireless communication network from a wireless base station connected via a physical line and outputs the acquired information to the buffer size controller.

5. The data communication system as defined by claim 1, wherein a linking server, which sends or receives data to or from the application server over the wire communication network, divides a connection with the application server into two sub-connections and applies a transmission protocol to each of the sub-connections.

6. The data communication system as defined by claim 3, wherein a linking server, which sends or receives data to or from the application server over the wire communication network, divides a connection with the application server into two sub-connections and applies a transmission protocol to each of the sub-connections.

7. The data communication system as defined by claim 1, further comprising a network interface controller which controls a transmission of a packet to the wire communication network or the wireless communication network and sends information on the type of the communication network, to which the packet has been transmitted, to the retransmission timer setting unit or the buffer size controller.

8. The data communication system as defined by claim 3, further comprising a network interface controller which controls a transmission of a packet to the wire communication network or the wireless communication network and sends information on the type of the communication network, to which the packet has been transmitted, to the retransmission timer setting unit or the buffer size controller.

9. The data communication system as defined by claim 1, further comprising a transfer controller which controls establishment of a connection with the application server for use in packet transmission and passes the service identifier and the destination address to said retransmission timer setting unit.

10. The data communication system as defined by claim 1, wherein the communication network type contained in said table comprises only the wireless communication network type.

11. The data communication system as defined by claim 3, wherein the communication network type contained in said table comprises only the wireless communication network type.

12. A data communication system which sends or receives data to or from an application server using the same protocol via a transmission line comprising one type selected from the group consisting of a wire communication network, a wireless communication network, and both a wire communication network and a wireless communication network, said data communication system comprising:
  (a) a first table containing therein a relation among service identifiers of the application server(s), destination addresses, communication network types, and processing time of the application server;
  (b) a retransmission timer setting unit which references said first table to acquire the processing time of the application server based on the service identifier, destination address, and communication network type during transmission or reception of data to or from said application server and sets the time as a retransmission time;
  (c) a variable-length sending buffer in which data to be sent to the application server is stored;
  (d) a second table containing therein a relation among radio wave strength of the wireless communication network, error rates of data sent to or received from the communication network, the communication network types, and communication network transmission speeds; and
  (e) a buffer size controller which references the second table to adjust size of said sending buffer based on the acquired radio wave strength and the error rate.

13. A data communication method for sending or receiving data to or from an application server using the same protocol via a transmission line comprising one type selected from the group consisting of a wire communication network, a wireless communication network, and both a wire communication network and a wireless communication network, said data communication method comprising the steps of:
  (a) storing relation among service identifiers of the application server, destination addresses, communication network types, and processing time of the application server in a table; and
  (b) referencing said table to set the processing time of the application server as a retransmission time based on the service identifier, destination address, and communication network type during transmission or reception of data to or from said application server.

* * * * *